E. R. GURNEY.
INTERNAL GEAR DRIVE.
APPLICATION FILED JUNE 18, 1917.

1,282,689.

Patented Oct. 22, 1918.

WITNESSES:
W. C. Ross.

INVENTOR.
Erving R. Gurney.
BY Chapin + Neal
ATTORNEYS.

UNITED STATES PATENT OFFICE.

ERVING R. GURNEY, OF SPRINGFIELD, MASSACHUSETTS.

INTERNAL GEAR-DRIVE.

1,282,689.

Specification of Letters Patent.

Patented Oct. 22, 1918.

Application filed June 18, 1917. Serial No. 175,419.

*To all whom it may concern:*

Be it known that I, ERVING R. GURNEY, a citizen of the United States of America, residing at Springfield, in the county of Hampden and State of Massachusetts, have invented certain new and useful Improvements in Internal Gear-Drives, of which the following is a specification.

This invention relates to improvements in internal gear drives, and more particularly to drives of this type which are adapted for use with the driving wheels of motor vehicles, such as automobiles, motor trucks, and so forth.

Commonly, the internal gear of gear driven vehicle wheels, such as the driving wheels of motor trucks, for example, are mounted within the brake drum. With the larger motor vehicles, it is generally desirable to employ a brake band operable on the internal periphery of the brake drum, as well as the usual hand brake operable on the external periphery of the latter. When, however, the internal gear is mounted within the brake drum, difficulty arises, when an internal brake band is employed, for the reason that some of the lubricant for the gear and sometimes some of the lubricant from the bearings works its way between the internal brake band and the drum to the detriment of efficient braking action.

This invention has for its object to provide in an internal gear drive, wherein the internal gear and an internal brake band are mounted within the brake drum, improved partitioning means within the latter to separate the gear and brake band elements without interfering with the usual functions of these elements and in such a manner that the function of each element may be efficiently accomplished.

Other objects and advantages will appear in the following description and will be particularly pointed out in the appended claims.

The invention, in an embodiment at present preferred, is shown for illustrative purposes in the accompanying drawings, in which—

Figures 1, 2, 3:
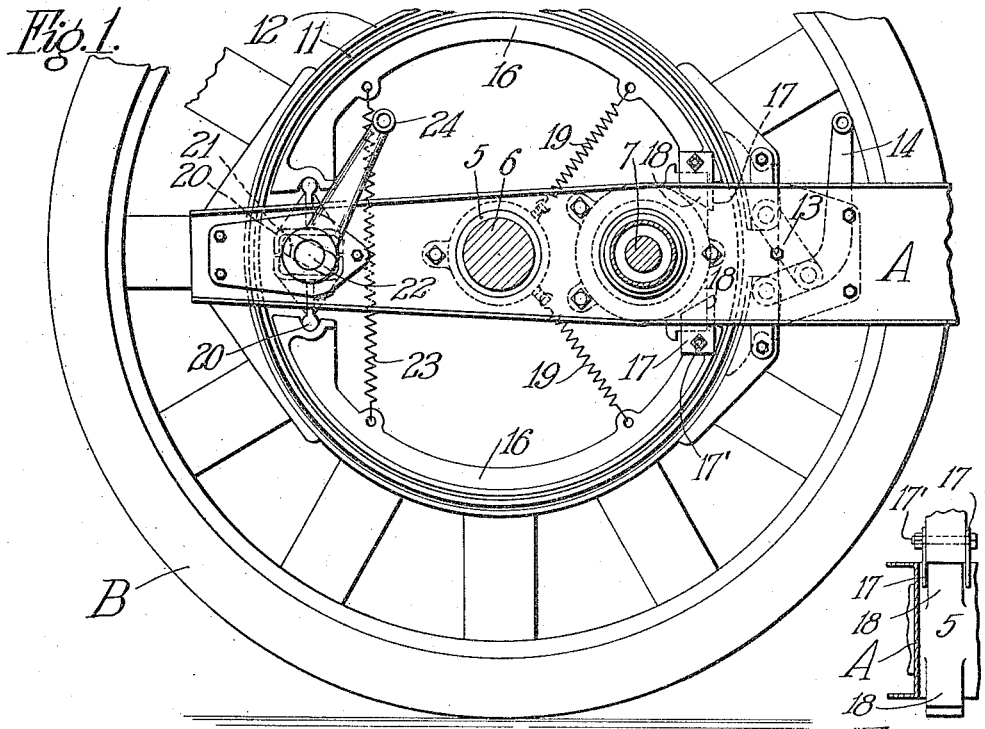
Figure 1 is a sectional elevational view of an internally gear driven vehicle wheel embodying the invention.
Fig. 2 is a sectional plan view of Fig. 1.
Fig. 3 is a fragmentary detail view illustrative of the pivotal mounting of the internal brake band members.

Referring to these drawings, the invention will be described in connection with one of its specific uses, namely, as applied to an internal gear drive for a vehicle wheel, such as an automobile driving wheel, for example. The invention is, however, capable of other uses than the specific one to be described, which is given merely for illustrative purposes.

A represents one frame member of a motor vehicle and secured thereto, by the bolts shown in Fig. 2, is member 5, which has a central socket to receive a dead axle 6 and at a distance from this socket a suitable ball bearing to receive and rotatably support one end of a live axle 7. The dead axle 6 is keyed to member 5 and extends through and beyond the member to receive a suitable wheel B. The latter has a central hollow sleeve 8, which is formed with an integral circular flange 9 to engage the inner face of the wheel, and this sleeve is held to the wheel by suitable bolts extending through the latter and the flange 9, as clearly shown in Fig. 2. Within the sleeve 8 are suitable bearings, preferably roller bearings, as illustrated, which rotatably support the wheel from the described dead axle 6.

Clamped between the flange 9, and one end face of the wheel B is a circular plate 10 which has formed thereon a circular flange 11 which is directed away from the wheel. Flange 11 is arranged in concentrical relation with axle 6 and constitutes a hollow brake drum. About the exterior of the latter is a split circular brake band 12. the upper and lower ends of which are pivotally connected respectively to a link 13 and a lever 14. The link 13 is pivotally connected to the lever, and the latter is arranged for connection with suitable actuating means, whereby a pull on the lever toward the right (Fig. 1) will draw the ends of band 12 together and draw the band around the drum for braking action in an obvious manner.

Within drum 11 is an internal brake band which consists of upper and lower substantially semi-circular members 16. The latter are supported at one end on projections 18, integrally formed on the described member 5, which projections, as shown in Fig. 3, are substantially equal in width to the members 16. On opposite faces of each member 16 are plates 17 which are secured thereto by a bolt 17', and extend beyond the member 16 to overlap the projections, as shown in Fig. 3. The projections 18 are technically known as the "anchor" for the brake band and coöperate with plates 17 to form a loose pivotal connection therefor. The members 17, although loosely fitting projections 18 are held in position by springs 19 attached to the member 5, as indicated in Fig. 1. The free ends of the brake band members 16 are flanged, as shown in Fig. 1, and in the flanged portions are rounded depressions which are adapted to receive the rounded ends of separator members 20. The other ends of the latter are U-shaped and the two members are mounted in opposed relation so that the two U-shaped portions form a boxlike inclosure. A cam 21, fixed on the end of a short shaft 22 mounted in a bracket attached to frame A, is positioned within the boxlike inclosure thus formed. Normally the cam 21 is positioned as shown in Fig. 1 and the free ends of member 16, which are connected together by a spring 23, are drawn together and away from drum 11. The force exerted on members 16 by spring 23 draws the two separators 20 toward one another and holds them in engagement with the cam, and lateral displacement of the separators is prevented by the engagement of the sides of the latter with the cam. A suitable lever 24 is fixed to the end of shaft 22 to turn the latter, and it will be obvious that cam 21, when turned from the position illustrated, will separate the parts 20 and force the brake band members 16 against the interior of drum 11.

The construction and arrangement of the internal brake band is important and advantageous for the reason that the brake band may be readily and conveniently removed without removing the wheel. The corresponding ends of the two members 16 are spaced one from another a distance slightly greater than the height of member A. Thus, after removing springs 19 and 23 and the nuts on bolts 17', the plates 17 adjacent member A may be removed and thereafter the members A may be drawn axially inward out of the brake drum 11. The separators 20 are important as a loose connection between cam 21 and the ends of members 16 to permit ready removal of the latter.

Secured to the portion 10 of the brake drum and in concentrical relation with the latter is an internal gear 26 (Fig. 2) and in mesh with the gear is a pinion 27 which is suitably fixed on the end of the described live axle 7. The latter is suitably driven in the usual manner from the power plant of the vehicle. It is to be understood that in the adaptation of the invention illustrated, another wheel unit, of similar construction but reversely arranged with respect to the one described, is employed which is likewise mounted on axle 6, and another live axle corresponding to axle 7 is also employed, the two live axles being connected in the usual manner by a differential to the transmission shaft of the vehicle. The second wheel unit has been omitted from the illustration as being a mere duplication of parts and as unnecessary illustration to an understanding of the invention.

This invention is more particularly concerned with the provision of means whereby the revoluble gear 26 may at all times be separated from the relatively stationary brake band members 16. This separating means, in the preferred embodiment of the invention illustrated, consists of a cup-shaped member 30, which is preferably formed integral with the described stationary member 5, and a packing ring 31 of suitable material, such as leather or the like, for example. The cup-shaped member 30 is arranged to freely receive the annular gear 26, and the latter extends into the member 30 as shown, so that the circular flange of the member overlaps a substantial portion of the outer periphery of the gear. The strip 31 is secured, as indicated, to the outer end face of member 30 and its inner portion is bent inwardly substantially at right angles so that it bears against the outer periphery of gear 26.

By reason of the fact that the circular flange portion of the cup-shaped member 30 overlaps the outer peripheral portion of gear 26, the lubricant used on the latter is restrained from being thrown outwardly by centrifugal force against the internal periphery of the brake drum. The lubricant thrown by the revolving gear 26 is stopped by the circular flange of member 30, and the strip 31 prevents lubricant thus thrown outwardly from creeping along the space between the interior of the member 30 and the exterior of gear 26. It is to be particularly noted that such lubricant as attempts to pass the packing strip 31 acts on the strip in such directions that the latter is forced more tightly than ever against the external periphery of the gear. For example, the lubricant acts with pressure on the strip in both an axial and a radial direction with respect to the gear 26. The radial pressure acts directly to force that portion of the strip which is contiguous with the gear againts the latter and the axial pressure accomplishes the same effect indirectly, for the outwardly directed force tends to displace the other portion of the strip and an outward bending of the latter portion tends to throw the first-named portion against the gear.

It is also to be noted that lubricant from the bearings for axles 6 and 7 is also confined within the member 30 and, if desired, the entire space between the interiors of gear 26 and member 30 may be filled with lubricant without any real danger of leakage into the space between the brake drum and its internal brake band.

Thus an advantageous and efficient means of separating the internal brake band and the internal gear within the brake drum of an internally gear driven unit has been provided. It is recognized that modifications may be made in the structure herein described for illustrative purposes without departing from the scope of the invention which is defined by the appended claims rather than by the foregoing description.

What I claim is—

1. The combination in an internal gear drive, of a brake drum, a gear concentrically mounted within the later, an internal brake band mounted within said drum and arranged to be forced against the internal periphery of the latter, and, within said drum, a partitioning means including a self-adjustable packing ring to separate the brake band and gear.

2. The combination in an internal gear drive, of a brake drum, an internal gear mounted concentrically within the latter to turn therewith, a brake band within the drum adapted to engage the internal periphery thereof, a member interposed between said gear and band, said member having a cup-shaped part into which said gear extends so that the peripheries of the latter and said member overlap, and means on said member to bear on the outer periphery of said gear to separate the space within said gear and member from the space within which said brake band is mounted.

3. An internally gear driven wheel unit, comprising, a dead axle, a wheel rotatably mounted thereon, a brake drum fixed to the wheel, an annular gear fixed to the drum and wheel, a member in which said axle is mounted, a live axle rotatably mounted in said member, a pinion on the last-named axle to mesh with said gear, a brake band adapted to engage the internal periphery of the brake drum, said member having a cup-shaped portion interposed between said gear and brake band and arranged so that its periphery overlaps that of the gear, and packing means on said member to engage the outer periphery of said gear, all constructed and arranged so that lubricant from said gear and pinion and lubricant from said axles is confined within said portion and packing means.

4. An internal gear drive mechanism for a power wheel, comprising in combination the power wheel, and a brake drum therefor, said mechanism including an internal gear located within and concentrically of the brake drum, and a wall spaced from side and outer faces of the internal gear with a self-adjustable packing ring between the wall and outer periphery of the internal gear, whereby grease may be retained in the space between the wall and gear and away from the brake drum.

5. In combination an internal gear, a spaced cup-shaped member to receive the internal gear, and a brake drum to receive the two, all three arranged with ends overlapped, and a flexible ring of packing material, such as leather, arranged around the nested edge of the cup-shaped member and extending therefrom inwardly of the member and to and around and flat against the outer periphery of the internal gear, whereby the grease from the latter will be retained in the space between it, the cup-shaped member, and the flexible ring.

6. An internal gear wheel driving mechanism, comprising, a dead axle, a live axle, a wheel and an internal gear bearing on the dead axle, and a driving pinion therefor on the live axle, and means on the wheel to close one side of the internal gear, a brake drum on the dead axle within which the internal gear and driving pinion therefor are nested, and a cover member through which the two axles extend and which is nested within the brake drum between the latter and the internal gear and provided with a flexible right angle flange member made of suitable packing material extending toward, around, and flat against the outer periphery of the internal gear to hug the latter and thereby prevent the escape of grease to the space between the cover and the braking drum.

7. The combination with a wheel, its axle and a member supported thereby, a brake drum on the wheel between the latter and said member and opening toward the member, two arcuate brake band devices within the drum, means pivotally mounted on said member to separately support one end of each brake band device, and means to separate the other ends of the brake band devices to expand the latter against the inner periphery of the brake drum, said brake band devices, their supporting and separating means being constructed and arranged to permit each brake band device to be withdrawn axially from the drum toward and beyond said member.

8. The combination, with a wheel, an axle and a member supported therefrom, of a brake-drum on the wheel between the latter and said member and opening toward the member, braking means within said drum, supporting means for the braking means and carried by said member, and actuating devices on said member for the braking means, said braking means, supporting means, and actuating devices being constructed and arranged to permit the braking means to be withdrawn axially from the drum toward and beyond said member.

ERVING R. GURNEY.

Copies of this patent may be obtained for five cents each, by addressing the "Commissioner of Patents, Washington, D. C."